April 5, 1966  F. BILD  3,244,786
EXTRUSION PROCESS AND APPARATUS THEREFOR
Filed June 24, 1963
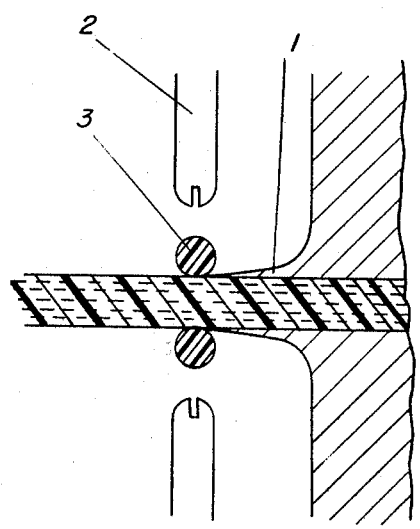
INVENTOR
FREDERICK BILD
By
Cushman, Darby & Cushman
ATTORNEYS

United States Patent Office 3,244,786
Patented Apr. 5, 1966

3,244,786
EXTRUSION PROCESS AND APPARATUS THEREFOR
Frederick Bild, Highgate, London, England, assignor to Imperial Chemical Industries Limited, London, England, a corporation of England
Filed June 24, 1963, Ser. No. 290,127
4 Claims. (Cl. 264—176)

This invention relates to the extrusion of thermoplastic polymeric materials, and apparatus therefor.

Thermoplastic polymeric materials comprise many commercially important plastics and film and fibre forming materials, examples of which are the polyolefines, e.g., polyethene, polystyrene and isotactic polypropylene; polyamides, e.g., polyhexamethylene adipamide and polycaprolactam; acrylic polymers, e.g., polymethyl methacrylate; polyacetals, e.g., polymers or copolymers of formaldehyde; polyesters, e.g., polyethylene terephthalate, and cellulosic materials, e.g., cellulose acetate/butyrate.

An important process applied to thermoplastic material is extrusion, either for the production of moulding pellets or for forming sheet, pipes, tubes, rods and other useful profiles. In this process the thermoplastic material is subjected to high temperatures in order to form a viscous melt, and after leaving the extrusion die is normally cooled within a short period so as to solidify at least its surface.

The face of the die surrounding the extrusion orifice is normally free from build-up of the polymer melt; depending on the polymer being extruded, the rate of extrusion and the die temperature, however, it is sometimes found that collars of polymer are found around the extrusion orifice.

These collars are exposed to high temperature, normally in the presence of air, for a period longer than the bulk of the extrudate, and frequently become discoloured owing to thermal degradation or thermally induced oxidation which these conditions may entail.

From time to time these collars or parts of them may break away and be carried forward with the profile, thereby introducing irregularities in the latter, and possibly contamination by discoloured material. This contamination may be very serious if the extrudate is to be comminuted for the production of moulding pellets, since it will then become evenly distributed throughout a large batch of material and may cause expensive rejections.

To overcome the discolouration, it is normally necessary to incorporate in the whole of the polymer a larger amount of stabilizer than would otherwise be necessary, for the sake of stabilising the relatively small amount of polymer temporarily adherent to the die face. This is clearly wasteful, and the higher stabiliser level may adversely affect the properties of the polymer.

Parts of the collars carried forward on the profile may causing jamming of the comminution apparatus thereby halting production while the comminution apparatus is cleared.

It is an object of the present invention to provide a process for the extrusion of thermoplastic materials which eliminates contamination by discoloured material and in preferred embodiments reduces or even eliminates the irregularities in profile caused by the collars.

We have now found, most surprisingly, that if means are provided for cooling the collar which forms before it becomes detached from the die face, it may be more easily detached from the profile. At the same time, discolouration is eliminated.

Accordingly the present invention provides a process for preventing contamination of an extruded profile of a thermoplastic polymeric material by a discoloured collar of the said material temporarily adherent to the die face immediately surrounding the extrusion orifice, or by fragments of the said collar, which comprises cooling the die face immediately surrounding the extrusion orifice, and/or any of the said material adherent thereto, by a directed blast of cooling gas, the gas being supplied at such a rate that the said material is maintained while it is adherent to the die face at a temperature below that at which substantial thermal degradation or thermally induced reaction with the gas can occur. The present invention also provides apparatus therefor.

The gas is preferably air, carbon dioxide or nitrogen, the latter two being preferred for those polymeric materials which are more susceptible to oxidation.

The blast may be provided by a plurality of nozzles, which may for instance have a circular cross-section, and are spaced so as to given even cooling of the collar; alternatively, the nozzles may be replaced by elongated slits ("air knives"), or by a single slit, for instance, an annular slit. In either case the slit or slits should preferably be shaped so as to conform to the profile of the orifice. The nozzles or slits may be provided with means for adjustably controlling their aperture. The die face may be flat, or the extrusion orifices may stand proud of the die face.

The invention is particularly useful in the extrusion of polyamides, for instance in the extrusion of glass-filled polyhexamethylene adipamide.

It was found that the collars besides being much lighter in colour were less dense and more friable than those produced in the absence of cooling and were very loosely adherent to the extrudate, and nearly all the collars were detached by the nip rolls feeding the lace to the cutter for the production of moulding pellets, and were separately removed.

Accordingly the present invention provides a process for the removal of irregular accumulations derived from a collar of thermoplastic polymeric material encircling the extrusion orifice and temporarily adherent to the die face, from the surface of an extruded profile, which comprises cooling the die face immediately surrounding the extrusion orifice, and/or any polymer collar adherent thereto by a directed blast of cooling gas, the gas being supplied at such a rate that the said material is maintained, while it is adherent to the die face, at a temperature below that at which substantial themal degradation or thermally induced reaction with the gas can occur, allowing the collar or fragments thereof, when it has eventually become detached from the die face, to travel forward with the profile, cooling the profile until at least the surface thereof has solidified, applying shear, compression or impact forces to the collar while it is in contact with the profile, and separating the detached fragments of collar from the profile.

We have found that if the die face is so shaped that at the point where the extrudate leaves the die, the die face contacts the extrudate in a substantially tangential manner the amount of build up is reduced and the collars formed break away even more readily.

The invention is illustrated by the following example, in which references are to the accompanying drawing.

*Example*

Moulding pellets of a polyhexamethylene adipamide/glass fibre composition were prepared by the following method.

60 end glass rovings were fed between a pair of nip rolls on to a conveyor from whence they were passed into the feed pocket of a screw extruder. The extruder was provided with a vacuum take off device. Cube cut polyhexamethylene adipamide pellets were fed into the feed pocket of the extruder at such a rate that 67 parts of polymer were introduced for every 33 parts of glass fibre. The resultant mixture was extruded through a ¼ inch diameter circular die at a temperature of 290° C.; the extrudate was cooled to a temperature below about 160° C. by passing it through a bath of cold water, drawn between nip rolls and comminuted in a conventional lace cutter.

Discoloured collars of high glass content were found to build up around the extrusion orifice and break away in an irregular cycle, thereafter travelling forward with the lace, and passing through the nip rolls and into the cutter. Some contamination by black specks was noticed in articles moulded from the pellets. The moulding pellets were in some cases irregular in shape. Also the cutter jammed at times due to blockage by the collars that had broken away.

The die was modified by machining away its face so that the exit was virtually a knife-edge 1, i.e., the die face contacted the extrudate in a substantially tangential manner at the die exit; build-up of discoloured material however still occurred, and the discoloured material passed into the cutter as before.

Two "air-knives" 2 were then positioned to subject the collar 3 and the periphery of the orifice to a cooling blast. Although build-up still occurred, but broke away readily and the collars were carried along the profile, discolouration was eliminated, and the collars became detached almost immediately they touched the nip rolls of the cutter and did not pass into the cutter to contaminate the moulding pellets. At the same time, irregularities in the shape of the moulding pellets caused by the collars were eliminated.

The process was repeated using an annular slit to provide a blast of cold air on to the die orifice exit. In this case the die face was not machined away and the die face contacted the extrudate perpendicularly at the die exit. More build up occurred than when the die face was machined away but the collars broke away from the die readily. No discolouration or contamination was found.

I claim:
1. A process for preventing contamination of an extruded profile of a composition by a discoloured collar of the said composition temporarily adherent to the die face immediately surrounding the extrusion orifice, wherein said composition contains a thermoplastic polymeric material and glass fibers, said process comprising the steps of, cooling the area immediately adjacent to and surrounding the extrusion orifice, by a directed blast of cooling gas, and supplying the gas at such a rate that the said composition is maintained while it is adherent to the die face at a temperature below that at which thermal degradation or thermally induced reaction with the gas can occur.

2. A process according to claim 1 in which the thermoplastic polymeric material is a polyamide.

3. A process according to claim 2 in which the polyamide is polyhexamethylene adipamide.

4. Apparatus for preventing contamination of an extruded profile of a composition containing a thermoplastic polymeric material and glass fibers by a discoloured collar of said composition temporarily adherent to the die face immediately surrounding the extrusion orifice, which comprises means for directing a stream of gas at the area immediately adjacent to said extrusion orifice and wherein the die is so shaped that at the point where said extruded profile leaves said orifice, the face of said die contacts said profile at substantially a tangent.

References Cited by the Examiner
UNITED STATES PATENTS

| 1,700,208 | 1/1929 | Paisseau. | |
| 2,262,989 | 11/1941 | Conklin et al. | 264—175 |
| 2,342,443 | 2/1944 | Wood | 264—161 |
| 2,380,653 | 7/1945 | Kopplin | 264—161 |
| 2,436,201 | 2/1948 | Cole | 264—176 |
| 2,832,642 | 4/1958 | Lennox. | |
| 3,132,194 | 5/1964 | Edmonds et al. | 264—176 |

FOREIGN PATENTS

| 112,379 | 1/1941 | Australia. |
| 239,913 | 7/1962 | Australia. |
| 901,398 | 7/1962 | Great Britain. |

ROBERT F. WHITE, *Primary Examiner.*

S. A. HELLER, *Assistant Examiner.*